Aug. 8, 1933.  J. C. ALBRIGHT  1,921,145
METHOD OF AND APPARATUS FOR CONTROLLING THE FLOW OF FLUIDS
Filed Oct. 11, 1930
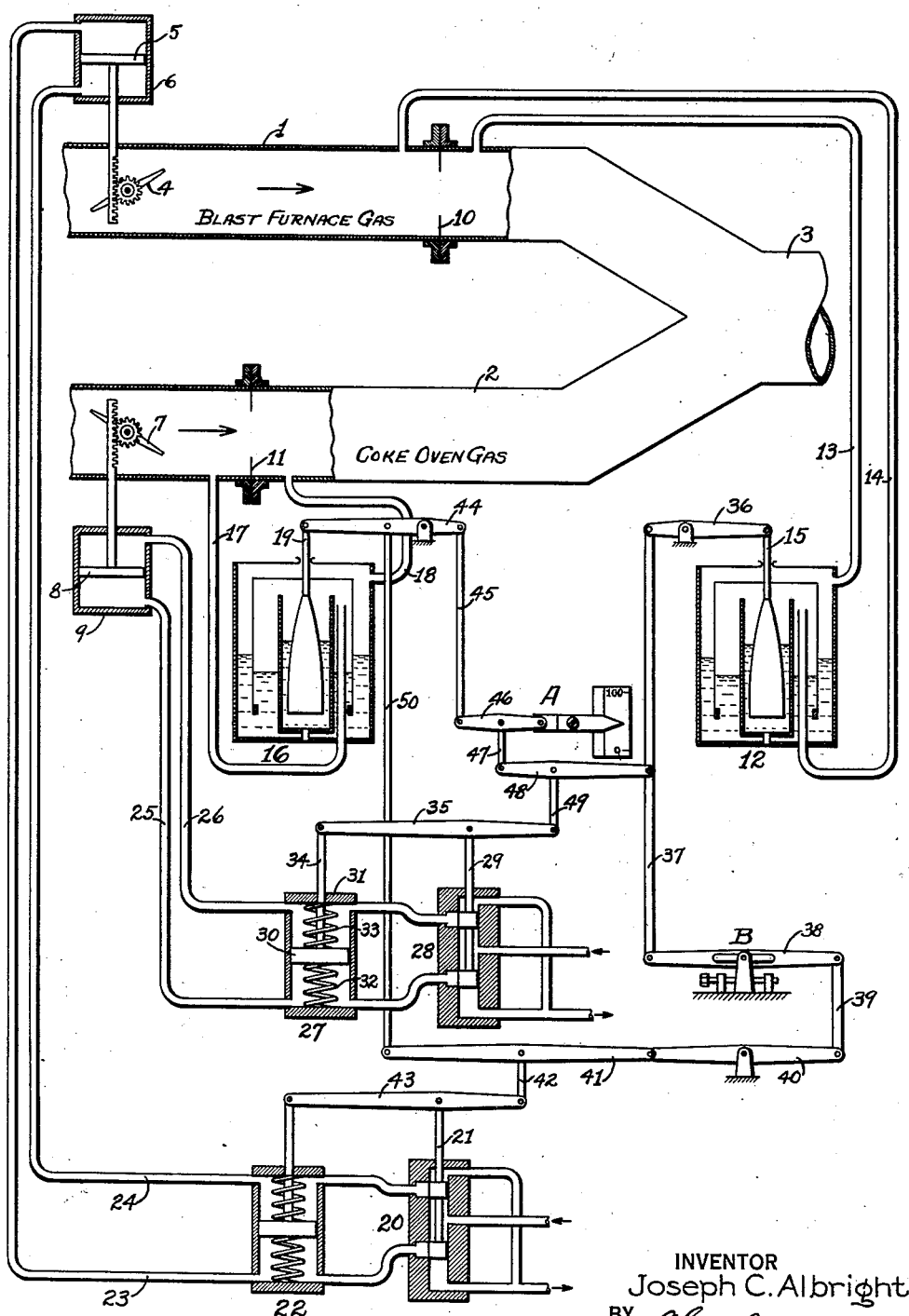
INVENTOR
Joseph C. Albright,
BY
ATTORNEY Patented Aug. 8, 1933

1,921,145

UNITED STATES PATENT OFFICE 1,921,145

METHOD OF AND APPARATUS FOR CONTROLLING THE FLOW OF FLUIDS

Joseph C. Albright, Cleveland Heights, Ohio, assignor to Bailey Meter Company, a Corporation of Delaware Application October 11, 1930. Serial No. 488,145

30 Claims. (Cl. 137—164)

This invention relates to a method of and apparatus for controlling the flow of fluids.

In practice it is frequently desired, as in combustion and chemical processes, to supply fluids in definite proportions or supply a definite number of heat units per unit time or a definite quantity per unit time of some constituent of a fluid or mixture of fluids.

My invention has as its primary object to control the flow of a plurality of fluids to supply heat units or a desired constituent of one or more of the fluids at a substantially constant rate.

Another object is to so control the flow of a plurality of fluids that besides supplying heat units or a desired constituent at a substantially constant rate, the quantity ratio of the individual streams of flowing fluids will be maintained substantially constant.

A further object is to provide apparatus enabling the quantity ratio of the flowing fluids to be readily varied at will.

Still another object is to provide apparatus enabling the rate of supply of heat units or a constituent to be readily varied at will.

Another object is to control the flow of a plurality of fluids to supply heat units or a constituent at a substantially constant rate, maintaining at the same time a substantially constant quantity ratio of the individual streams of flowing fluid, unless the supply of one or more of the flowing streams diminishes or ceases, in which case increasing the flow of the remaining stream or streams in proper amount to maintain a substantially constant rate of supply of heat units or a constituent regardless of quantity ratio.

By constituent I mean a component or a contained part, which may be measured or indicated as an amount, such for example as the $CO_2$ content of the gaseous products of combustion; as distinguished from condition, which I understand to mean a quality or degree, such for example as the pressure or temperature of a fluid.

Various other objects and advantages will become apparent from the description hereinafter.

As an example but in no wise a limitation I have illustrated and will describe one embodiment of my invention wherein two combustible gaseous fuels, namely coke oven gas and blast furnace gas, each of substantially constant calorific value, but of varying volume of supply are proportionately mixed to supply a furnace wherein it is desired to maintain as nearly a constant quantity ratio of the two fluids as possible, but primarily maintain a substantially constant rate of B.t.u. supply.

In the drawing the one figure is a diagrammatic representation of a preferred embodiment.

I have illustrated at 1 a conduit for conveying blast furnace gas and at 2 a conduit for conveying coke oven gas, the gases flowing in the direction of the arrows and uniting in a conduit 3 which is provided for conveying the mixed gas to a point of usage (not shown). As an example, assume that the heating value of the blast furnace gas is 100 B.t.u. per cubic foot and that of the coke oven gas 500 B.t.u. per cubic foot.

It is desired, for example, to supply to the furnace a total number of B.t.u. per unit time, and further, to proportion the quantity of flow of coke oven gas to blast furnace gas for the control of an illuminant or other property or constituent which might enter into the combustion of the mixed gas and the service performed by said combustion.

A damper 4 is shown as located in the conduit 1 for control of the flow of blast furnace gas and is capable of being positioned across the conduit through the medium of a hydraulic piston 5 operating in a cylinder 6. Similarly a damper 7 for control of the flow of coke oven gas is shown as located in the conduit 2 and capable of being positioned across the conduit through the medium of the piston 8 operating in a cylinder 9.

In general steel mill practice where both blast furnace gas and coke oven gas are produced and are used for heating furnaces, a supply of coke oven gas may be considered as always available. Blast furnace gas will be available in varying amounts according to the operation of the blast furnace and other usages for the gas. In the example being described, it is assumed that a definite total B.t.u. per unit time is needed to heat a furnace and that it is desirable to use a certain proportion of blast furnace gas when a plentiful supply of the blast furnace gas is available, but primarily to satisfy the demand for total B.t.u., even to the extent of feeding all coke oven gas, should the supply of blast furnace gas fail. The normal proportion desired to be, for example, two parts by volume blast furnace gas to one part coke oven gas, said proportion being determined by the calorific value, percentage of illuminant, volume of air required for combustion, or possibly other properties of the two gases.

On the assumption that coke oven gas will always be available, I have chosen its rate of flow as an index, and according to the present invention adjust its rate of flow when it is desired to vary the total supply of B.t.u. per unit time, after which adjustment I automatically vary the rate of flow of both gases to maintain a desired volume ratio between the two.

As an indication of the rate of flow of the gases, I have shown in connection with each of the conduits 1 and 2, a flow meter of the type responsive to the pressure differential created across an obstruction placed in the path of flowing fluid. In conduit 1 is an orifice plate 10, creating such a pressure differential, which will bear a known relation to the rate of flow through the conduit, and in the conduit 2 an orifice plate 11 for a similar purpose. A flow meter generally indicated at 12 is connected by the pipes 13 and 14 with the conduit 1 on opposite sides of the orifice 10 and will, responsive to variations in the rate of flow of blast furnace gas, cause its stem 15 to move vertically as a direct indication of the rate of flow.

A similar flow meter generally indicated at 16 is connected by the pipes 17 and 18 with the conduit 2 at opposite sides of the orifice 11 and has a stem 19 which will be positioned vertically as a direct indication of the rate of flow of coke oven gas.

Suitably connected to and moved by the flow meter stems 15 and 19 are various members for positioning pilot valves to allow the passage of hydraulic fluid to the power cylinders 6 and 9 to the end that dampers 4 and 7 will be properly positioned in the conduits 1 and 2 for regulating the flow of blast furnace gas and coke oven gas. A change in the rate of flow in either conduit effects motion of both dampers.

For passing hydraulic fluid to the power cylinder 6 is a pilot valve generally indicated at 20, receiving hydraulic fluid from a source (not shown), and adapted to pass fluid to drain, the direction of flow to and from the pilot assembly being indicated by arrows. When the pilot 21 is displaced from its normal position downwardly in the drawing, fluid is allowed to pass through the pilot assembly 20, the stabilizer assembly 22 and the pipe 23 to the cylinder 6 on the upper side of the piston 5. Simultaneously fluid is drained from below the piston 5 through the pipe 24, the stabilizer 22 and the pilot assembly 20, to the end that the piston 5 is moved downward and the damper 4 is positioned in a closing direction in the conduit 1, tending to throttle the flow of blast furnace gas.

A similar positioning of the damper 7 in the conduit 2 for throttling the flow of coke oven gas is accomplished through movement of the piston 8 in the power cylinder 9, to which fluid is allowed to pass through the pipes 25 and 26 from the stabilizer indicated at 27 and the pilot assembly indicated at 28, the latter containing a pilot 29.

The stabilizing devices generally illustrated at 22 and 27 are of the type disclosed in my co-pending application, Serial No. 384,441 filed August 8, 1929, so that only a brief description of their operation will be necessary herein. I will describe briefly the stabilizer 27 of which the stabilizer 22 is a duplicate.

The piston 30 positioned normally in the cylinder 31 of the assembly 27, by the springs 32 and 33, has a piston rod 34 extending through one head of the cylinder and connected to a beam 35 from which is suspended the pilot 29. Assuming that the pilot 29 has been displaced downwardly through movement of the beam 35, pivoting around the end which is joined to the piston rod 34, then hydraulic fluid under pressure from the source (not shown) is admitted past the pilot to the cylinder 31 at the underside of the piston 30 and through the pipe 25 to the power cylinder 9. Simultaneously, fluid is drained from the cylinder 31 at the upper side of the piston 30 along with fluid drained from the upper part of the cylinder 9 through the pipe 26. The result is that a certain amount of the fluid under pressure passed by the pilot to the cylinder 9 is effective in the stabilizer assembly 27 to move the piston 30 upward, against the spring 33 under compression and the spring 32 in tension, tending to rotate the beam 35 about the end opposite that connected to the piston rod 34, and moving the pilot 29 upward, tending to close off passage of hydraulic fluid. The springs 32 and 33 will tend to position the piston 30 to its normal location in the cylinder 31, and by so doing will cause some of the fluid on the lower side of the piston 30 to pass to the cylinder 9. The downward motion of the piston 30 through the reaction of the springs will tend to move the pilot 29 downwardly again and pass through another increment of fluid. The result is a stabilizing of the action to prevent overtraveling and hunting, as fully disclosed in the above mentioned patent application.

I have shown on the drawing cooperating members for positioning the pilots 21 and 29 to allow passage of hydraulic fluid to the power cylinders 6 and 9. The cooperating members are interconnected between the pilots and the flow meters 12 and 16 to result in a positioning of the pilots 21 and 29 in accordance with the position of the movable stems 15 and 19 of the flow meters to the end that the positioning of the pilots is in accordance with the rate of flow of the fluids to be controlled.

Considering in detail first those cooperating members connected to and moved by the flow meter 12, I have shown a fulcrumed beam 36 to one end of which the stem 15 of the flow meter imparts motion about the fulcrum of the beam. Suspended from the other end of the beam is a rod 37 at its lower end pivoted to a fulcrumed beam indicated at 38. The fulcrum of the beam 38 is adjustable by the adjustment designated in general at B in a manner such that the moment arm of the beam 38 on one side of the fulcrum may increase at the expense of the moment arm on the other side of the fulcrum, and vice versa.

Suspended from the end of the beam 38 opposite that to which is joined the rod 37, is a rod 39 pivoted to and effective upon the fulcrumed beam 40, which in turn positions one end of the beam 41 carrying intermediate its ends a short connecting rod 42. Vertical motion of the rod 42 which is pivotally connected to one end of a beam 43, raises or lowers the pilot 21 which is suspended intermediate the ends of the beam 43, the opposite end of the beam 43 being joined to the piston rod of the stabilizing device 22.

It will be seen that a vertically upward motion of the stem 15 of the flow meter 12 results through the members above detailed in a vertically downward positioning of the pilot 21 to allow the passage of hydraulic fluid through the pipe 23 to the upper side of the piston 5 in the cylinder 6, resulting in a positioning of the damper 4 in a closing direction relative to the conduit 1.

The stem 19 of the flow meter 16 is suspended from one end of a fulcrumed beam 44 which is somewhat similar to the beam 36 of the flow meter 12. From the opposite end of the beam 44 is suspended a rod 45 which acts through the beam 46, the rod 47, the beam 48 and the rod 49 to one end of the beam 35 from which is suspended the pilot 29. From the beam 44 is also suspended a rod 50 from a point intermediate the point of connection of the stem 19 and the fulcrum, and joining at its lower end to one end of the beam 41 above described.

One end of the beam 46 is pivoted at an adjusting device designated generally at A. This pivot point may be raised or lowered vertically, and restrained in that position through clamping of the device A against the index shown. The beam 48 transmitting motion to the rod 49 is pivoted at one end to the rod 47 and at the other end to the rod 37.

From the above detailed description of the cooperating members it will be seen that a vertical upward movement of the stem 15 of the flow meter 12 not only effects a downward positioning of the pilot 21, but at the same time through the beam 48 which joins the rod 37 it effects a downward positioning of the pilot 29.

Considering the stem 15 of the flow meter 12 in a stationary position, then an upward positioning of the stem 19 of the flow meter 16 results in a raising or upward positioning of the pilot 21 and a downward positioning of the pilot 29.

Vertical motion of the hand adjusted pivot A results in an adjustment of the total flow on a total B. t. u. per unit time basis. Adjustment of the fulcrum B horizontally results in a variation of desired measure, of the volume ratio between blast furnace gas and coke oven gas supplied. Assuming, in operation, that the coke oven gas flow is an index since the quantity supply is always available, and that it is desired to supply mixed gas through the conduit 3 to a point of usage (not shown) in a volume ratio of two parts blast furnace gas to one part coke oven gas and at a total desired B. t. u. per unit time, then the adjustments A and B will be, for example, in the shown positions.

If, then, the flow of blast furnace gas increases due to an increased supply, the increased rate of flow as indicated by the flow meter 12 will result in a vertical upward motion of the flow meter stem 15. Through the cooperating members as explained above, the pilot 21 will be positioned downward on the drawing, and hydraulic fluid allowed to pass through the pipe 23 will effect a positioning of the damper 4 relative to the conduit 1 in a closing or throttling direction, tending to pinch down on the flow of blast furnace gas and return the flow to that desired. At the same time the upward movement of the stem 15 has resulted in a downward positioning of the pilot 29, allowing a passage of hydraulic fluid through the pipe 25 to the cylinder 9, tending to effect a closing or throttling of the damper 7 in the coke oven gas flow conduit 2. The amount of motion of the damper 7, however, will be different than the motion of the damper 4 to effect the proper ratio of flow between blast furnace gas and coke oven gas as determined by the position of the adjustable fulcrum B. That is, the effect of the vertical motion of the stem 15 upon the pilot 21 will be different than upon the pilot 29 through the proper moment arm and adjustment of the fulcrum B.

The readjusted flow of blast furnace gas through the positioning of the damper 4, and of coke oven gas through the positioning of the damper 7, effective respectively upon the flow meters 12 and 16, will tend to return the various cooperating members and pilots to their normal positions, wherein under the new pressure condition ahead of the damper 4 in the blast furnace gas line the dampers have been properly positioned to result in the desired final supply of B. t. u. of mixed gas through the conduit 3 and in the proper volume proportions of the two gases.

If it is desired to vary the ratio of volume flow between the blast furnace gas and coke oven gas supplied to the mixing conduit 3, then a movement of the fulcrum B will vary the moment arms of the beam 38 to the end that a vertical motion of the stem 15 of the flow meter 12 effective as before upon the pilot 29 will now be effective to a greater or lesser extent upon the pilot 21.

Vertical motion of the pivot A through the hand adjustment, results in a change of the total supply of volume and correspondingly of B. t. u. through the conduit 3, as it shifts the pilot 29 controlling the flow of coke oven gas and a new rate of flow through the conduit 2 as indicated by vertical motion of the flow meter stem 19 will be necessary to return the pilot 29 to its initial position. Simultaneously the change in flow of coke oven gas through movement of the stem 19 will be effective upon the pilot 21 to vary the flow of blast furnace gas in proper proportion.

It will be seen that with the B. t. u. per cubic foot of blast furnace gas and coke oven gas each remaining substantially constant so that a volume measurement is representative of B. t. u. measurement, I have a control which will result in a constant total supply of B. t. u. per unit time, as well as a desired proportioning of volume of blast furnace gas to coke oven gas, or in other words will maintain the flow in desired ratio irrespective of total B. t. u. demand so long as there is a sufficient supply of blast furnace gas. In case of a partial or complete failure of the blast furnace gas, however, the control will increase the coke oven gas to maintain the total B. t. u. regardless of the volume ratio of the two gases. Since the coke oven gas contains a higher B. t. u. per cubic foot than does the blast furnace gas, then the volumetric delivery will be less. The control will open the blast furnace gas damper wide, and use all of the blast furnace gas available, until there is a return of the supply of blast furnace gas, when it will readjust itself to the proper ratio of volumes.

Suppose, for example, that the blast furnace gas supply begins to decrease, resulting in a lowering of pressure ahead of the damper 4. The decreased flow effective upon the flow meter 12 will result in a downward motion of the stem 15 and correspondingly an upward motion of the pilot 21 for positioning the damper 4 in an opening direction. If this condition persists, the damper 4 will eventually be wide open, and if sufficient blast furnace gas is not supplied, then the flow meter stem 15 will continue to move downward and the pilot 21 to be positioned upward, although with no further effect after having opened the damper 4 wide.

In the meantime the downward movement of the stem 15 will have caused an upward movement of the pilot 29 through the intermediary of the rod 37, the beam 48, and the rod 49. This upward positioning of the pilot 29 will result in the passage of hydraulic fluid to the cylinder 9 in a direction to position the damper 7 in an opening direction in the conduit 2 and allow a greater flow of coke oven gas to the mixing conduit 3, the cooperating members being of proper proportion and moment arm according to the B. t. u. content per cubic foot of the two gases, such that the proper B. t. u. of coke oven gas is supplied to make up for the deficiency of blast furnace gas, even though the B. t. u. content per unit volume is not the same.

It will be seen that with my invention I have the advantage of properly proportioning in desirable volume ratio. coke oven gas and blast furnace gas to a point of usage, and at the same time controlling the total flow in a manner to supply a total B. t. u. per unit time as desired. When there is a plentiful supply available of both gases, then a definite volume ratio will exist between the rates of flow of the blast furnace gas and the mixture; the coke oven gas and the mixture, and between the blast furnace gas and the coke oven gas. If, however, the available supply of blast furnace gas falls below that necessary to maintain the desired volume ratio, the rate of flow of the coke oven gas will be increased to maintain the desired total B. t. u. in an amount in proportion depending upon the ratio between blast furnace gas and the mixture, and the B. t. u. content of the two gases. For a constant total B. t. u. of the mixture, the volume of the mixture will decrease as the volume of blast furnace gas decreases, so that while a part of the control is adapted to maintain a desired volume ratio, the primary function is to maintain a desirable total B. t. u. supply, irrespective of volume supply or volume ratio.

I have the further advantage that should the supply of blast furnace gas decrease or cease, then I immediately forego the volume ratio feature and continue with the control which is of primary importance, namely, the supply of total B. t. u. per unit time.

I provide ready adjustments for varying the ratio of volume flow of the two gases and for varying the total B. t. u. per unit time of supply in the mixed gas. It will be understood that in describing a preferred embodiment of my invention I have not limited myself other than as claimed in view of prior art. For instance, other fluids than the gases described may be proportioned, and more than two streams may be controlled in desired volume ratio and for a definite total supply of B. t. u. or of a constituent.

I might desirably proportion and mix two chemical fluids in a process so that a constituent of each of the two would appear in desired amount in the mixed stream, and at the same time the volume or quantity ratio between the two separate streams be maintained as desired.

With my invention it would be possible to proportion a fluid fuel and air for combustion in a manner such that the mixture would have a constant quantity of potential heat units per unit time, and at the same time the oxygen content would be maintained in desirable quantity for efficient combustion.

It is not necessary, in accordance with my invention, to use the type of pressure differential responsive flow meters shown, nor is it essential that hydraulic fluid means be employed to position the dampers for controlling the rate of flow.

What I claim as new and desire to secure by Letters Patent of the United States, is:—

1. The method of mixing a plurality of streams of fluid each containing a different but substantially constant amount per unit volume of a constituent, to form a mixture having a substantially constant total amount of said constituent per unit time, which comprises measuring the rate of flow of each of the constituent streams of fluid, determining the ratio of said rates of flow, comparing the ratio of said rates of flow with a predetermined ratio, and subjecting each of the constituent streams of said mixture to control in accordance with the difference between said ratios.

2. The method of mixing a plurality of streams of fluid each containing a different but substantially constant amount per unit volume of a constituent, to form a mixture having a substantially constant total amount of said constituent per unit time, which comprises measuring the rate of flow of each of the constituent streams of fluid, determining the ratio of said rates of flow, comparing the ratio of said rates of flow with a predetermined ratio, and subjecting more than one of the constituent streams of said mixture to control in accordance with the difference between said ratios.

3. The method of mixing a plurality of streams of combustible fluid of different but each substantially constant total heating value per unit volume, to form a combustible mixture of substantially constant total heating value per unit time, which comprises measuring the rate of flow of each of the constituent streams of fluid, determining the ratio of said rates of flow, comparing the ratio of said rates of flow with a predetermined ratio, and subjecting each of the constituent streams of said mixture to control in accordance with the difference between said ratios.

4. The method of mixing a plurality of streams of combustible fluid of different but each substantially constant total heating value per unit volume, to form a combustible mixture of substantially constant total heating value per unit time, which comprises measuring the rate of flow of each of the constituent streams of fluid, determining the ratio of said rates of flow, comparing the ratio of said rates of flow with a predetermined ratio, and subjecting more than one of the constituent streams of said mixture to control in accordance with the difference between said ratios.

5. The method of proportioning streams of flowing fluids to form a mixture thereof, which comprises measuring the rate of flow of each of the constituent streams of fluid, determining the ratio of said rates of flow, determining the total of said rates of flow, and subjecting each of the constituent streams to control in accordance with the departure of the relation between said ratio and said total from a predetermined relation.

6. The method of proportioning flowing streams of fluids to form a mixture thereof, which comprises measuring the rate of flow of each of the constituent streams of fluid, determining the ratio of said rates of flow, determining the total of said rates of flow, and subjecting more than one of the constituent streams to control in accordance with the departure of the relation between said ratio and said total from a predetermined relation.

7. The method of mixing a plurality of streams of fluid each containing a different but substantially constant amount per unit volume of a constituent, to form a flowing mixture having a substantially constant total amount of said constituent per unit time, which comprises measuring the rate of flow of each of the constituent streams of fluid, determining the ratio of said rates of flow, determining the actual total of the rates of flow of the constituent streams of fluid subjecting each of the constituent streams of said mixture to control in accordance with the deviation of the ratio of the flows of the constituent streams from a predetermined ratio, and further subjecting one or more of the constituent streams to control in accordance with the deviation from a predetermined value of the actual total of the rates of flow.

8. A mechanism for controlling the flow of the constituent fluids of a mixture thereof, comprising in combination a flow meter for each of the constituent fluids, valve means for each of the constituent fluids, control means for each of said valve means, coacting means positioned by said flow meters, said coacting means including ratio determining means of the rates of flow of the constituent fluids, and means responsive to a departure of said ratio from a predetermined ratio for positioning said control means.

9. A mechanism for controlling the flow of the constituent fluids of a mixture thereof, comprising in combination a flow meter for each of the constituent fluids, valve means for each of the constituent fluids, control means for each of said valve means, coacting means positioned by said flow meters, said coacting means including ratio determining means of the rates of flow of the constituent fluids, means responsive to a departure of said ratio from a predetermined ratio for positioning said control means, and hand adjustable means for changing said predetermined ratio.

10. A mechanism for controlling the flow of the constituent fluids of a mixture thereof, comprising in combination a flow meter for each of the constituent fluids, valve means for each of the constituent fluids, control means for each of said valve means, coacting means positioned by said flow meters, said coacting means including ratio determining means of the rates of flow of the constituent fluids, means responsive to a departure of said ratio from a predetermined ratio for positioning said control means, hand adjustable means for changing said predetermined ratio, means positioned by said coacting means in accordance with the total of said rates of flow, and means responsive to a departure of said total from a predetermined total for positioning said control means.

11. A mechanism for controlling the flow of the constituent fluids of a mixture thereof, comprising in combination a flow meter for each of the constituent fluids, valve means for each of the constituent fluids, control means for each of said valve means, coacting means positioned by said flow meters, said coacting means including ratio determining means of the rates of flow of the constituent fluids, means responsive to a departure of said ratio from a predetermined ratio for positioning said control means, hand adjustable means for changing said predetermined ratio, means positioned by said coacting means in accordance with the total of said rates of flow, means responsive to a departure of said total from a predetermined total for positioning said control means, and hand adjustable means for changing said predetermined total.

12. Apparatus for controlling the quantity per unit time of a constituent of a flowing mixture of fluids, said constituent contained in different but substantially constant amount per unit volume in each of a plurality of fluid streams uniting to form said mixture, comprising in combination, means adapted to vary the flow of each stream, measuring means of the flow of each stream; coacting means positioned by said measuring means including means positioned in accordance with the ratio of the quantity per unit time of the flowing streams, means positioned in accordance with the deviation of said ratio from a predetermined value, said last-named means effective upon said first-named means tending to return said ratio to the predetermined value; said coacting means including means positioned in accordance with the total of the amounts per unit time of said constituent of the plurality of fluid streams, and means positioned in accordance with the deviation of said total from a predetermined total, said last-named means effective upon said first-named means tending to return said total to the predetermined total.

13. Apparatus for controlling the quantity per unit time of a constituent of a flowing mixture of fluids, said constituent contained in different but substantially constant amount per unit volume in each of a plurality of fluid streams uniting to form said mixture, comprising in combination, means adapted to vary the flow of each stream, measuring means of the flow of each stream; coacting means positioned by said measuring means including means positioned in accordance with the ratio of the quantity per unit time of the flowing streams, means positioned in accordance with the deviation of said ratio from a predetermined value, said last-named means effective upon said first-named means tending to return said ratio to the predetermined value, and hand adjustable means for varying said predetermined value; said coacting means including means positioned in accordance with the total of the amounts per unit time of said constituent of the plurality of fluid streams, means positioned in accordance with the deviation of said total from a predetermined total, said last-named means effective upon one or more of said first-named means tending to return said total to the predetermined total, and hand adjustable means for varying said predetermined total.

14. Apparatus for controlling the total heating value per unit time of a flowing combustible mixture of fluids, each of the constituent fluids of said mixture having a different but each substantially constant total heating value per unit volume, comprising in combination, means adapted to vary the flow of each stream, measuring means of the flow of each stream; coacting means positioned by said measuring means including means positioned in accordance with the ratio of the quantity per unit time of the flowing streams, means positioned in accordance with the deviation of said ratio from a predetermined value, said last-named means effective upon said first-named means tending to return said ratio to the predetermined value, and hand adjustable means for varying said predetermined value; said coacting means including means positioned in accordance with the total per unit time of the plurality of fluid streams, means positioned in accordance with the deviation of said total from a predetermined total, said last-named means effective upon one or more of said first-named means tending to return said total to the predetermined total and hand adjustable means for varying said predetermined total.

15. Apparatus for controlling the flow of the constitutent fluids of a mixture thereof, comprising in combination a conduit for each of said constituent fluids, flow responsive means for each constituent fluid, valve means in each conduit, positioning means for each valve means, control means for each positioning means, coacting members connecting said flow responsive means with said control means, said coacting members effective to actuate all of said control means in accordance with the departure from a predetermined ratio of the rates of flow of said constituent fluids, adjustable means for varying said predetermined ratio; said coacting members adapted to actuate one or more of said control means in accordance with the departure from a predetermined total of the rates of flow of the constituent flows, hand adjustable means for varying said predetermined total; said coacting members further adapted to actuate one or more of said control means in accordance with the departure from a predetermined ratio of the ratio between one or more of said constituent rates of flow and the total of said constituent flows.

16. A mechanism for controlling the flow of the constituent fluids of a mixture thereof, comprising in combination a flow meter for each of the constituent fluids, valve means for each of the constituent fluids, control means for each of said valve means, and coacting means positioned by said flow meters, said coacting means effective to cause an actuation of said control means whereby when the flow of one of the constituent fluids increases, the said valve means are positioned in a closing direction.

17. A mechanism for controlling the flow of each of two fluids to form a mixture thereof, comprising in combination a flow meter for each of the fluids, valve means for each of the fluids, control means for each of the valve means, and coacting means positioned by said flow meters effective to cause an actuation of said control means whereby when the flow of one of the two fluids increases, the said valve means are positioned in a closing direction, and when the flow of the other of the two fluids increases, the valve means for one of the fluids is positioned in an opening direction, and the valve means for the other of the fluids is positioned in a closing direction.

18. The method of mixing a plurality of streams of fluid each containing a different but substantially constant amount per unit volume of a constituent, to form a mixture having a substantially constant total amount of said constituent per unit time, which consists in causing a control to be directly effective upon each of the streams when the rate of flow in one of the streams varies.

19. The method of mixing a plurality of streams of fluid each containing a different but substantially constant amount per unit volume of a constituent, to form a mixture having a substantially constant total amount of said constituent per unit time, which consists in causing a control to be directly effective upon all of the streams when the rate of flow of any one of the streams varies.

20. A mechanism for controlling the flow of the constituent fluids of a mixture thereof, comprising in combination, a flow meter for each of the constituent fluids, valve means for each of the constituent fluids, control means for each of said valve means, and means responsive to one of said flow meters for positioning each of said control means.

21. A mechanism for controlling the flow of two fluids for a mixture thereof, comprising in combination a flow meter for each of the fluids, valve means for each of the fluids, control means for each of said valve means, and means responsive to either of the two flow meters for positioning all of said control means.

22. In a system for proportioning fluids, the combination of apparatus for automatically maintaining a practically fixed ratio between the volume flows, and means adapted to modify that ratio and responsive to changes in rate of flow of one of the fluids.

23. In a system for proportioning fluids for a mixture thereof, the combination of apparatus for automatically maintaining a practically fixed ratio between the volume flows, and means adapted to modify that ratio and responsive to departure in rate of flow of one of the fluids below that rate necessary to establish a perdetermined ratio between such flow and the total flow.

24. Apparatus for controlling the quantity per unit time of a constituent of a flowing mixture of fluids, the amount per unit volume of said constituent contained in each of a plurality of fluid streams uniting to form said mixture remaining substantially constant, comprising in combination, means adapted to vary the flow of each stream, measuring means of the flow of each stream; coacting means positioned by said measuring means including means positioned in accordance with the ratio of the quantity per unit time of the flowing streams, means positioned in accordance with the deviation of said ratio from a predetermined value, said last-named means effective upon said first-named means tending to return said ratio to the predetermined value; said coacting means including means positioned in accordance with the total of the amounts per unit time of said constituent in the plurality of fluid streams, and means positioned in accordance with the deviation of said total from a predetermined total, said last-named means effective upon said first-named means tending to return said total to the predetermined total.

25. Apparatus for controlling the quantity per unit time of a constituent of a flowing mixture of fluids, the amount per unit volume of said constituent contained in each of a plurality of fluid streams uniting to form said mixture remaining substantially constant, comprising in combination, means adapted to vary the flow of each stream, measuring means of the flow of each stream; coacting means positioned by said measuring means including means positioned in accordance with the ratio of the quantity per unit time of the flowing streams, means positioned in accordance with the deviation of said ratio from a predetermined value, said last-named means effective upon said first-named means tending to return said ratio to the predetermined value, and hand adujstable means for varying said predetermined value; said coacting means including means positioned in accordance with the total of the amounts per unit time of said constituent of the plurality of fluid streams, means positioned in accordance with the deviation of said total from a predetermined total, said last-named means effective upon one or more of said first-named means tending to return said total to the predetermined total, and hand adjustable means for varying said predetermined total.

26. Apparatus for proportioning flowing fluids, comprising in combination, a rate of flow meter for each of the fluids, flow controlling means for each of the fluids, fluid actuated means for positioning the flow controlling means, members interconnecting said flow meters, and a pilot valve for controlling said fluid actuated means and positioned by said members.

27. An automatic system for proportioning and controlling the total rate of flow of a plurality of fluid streams, comprising in combination, a rate of flow meter for each of the fluids, flow controlling means for each of the fluids, fluid actuated means for positioning the flow controlling means, members interconnecting said flow meters for determining the ratio between the rates of flow and the total flow of the fluids, a pilot valve for controlling one of said fluid actuated means positioned by the members in accordance with the ratio between the rates of flow, and another pilot valve for controlling another of said fluid actuated means positioned by the members in accordance with the total flow of the fluids.

28. The method of maintaining a desired ratio between a plurality of fluid streams which comprises, determining the rate of flow of each fluid, determining the ratio between the rates of flow, comparing said ratio to a predetermined ratio, and subjecting all of said streams to rate control in accordance with the deviation of the determined ratio from the predetermined ratio.

29. The method of controlling flowing fluids which includes producing an effect representative of the rate of flow of a first fluid, producing an effect representative of the rate of flow of a second fluid, determining the ratio between said effects, comparing said ratio to a predetermined ratio, subjecting one of said fluids to rate control in accordance with the difference between said ratios, determining the total of said effects, comparing said total with a predetermined total, and subjecting one of said fluids to rate control in accordance with the difference between said totals.

30. The method of controlling flowing fluids which includes determining the ratio between the rates of flow of a plurality of flowing fluids, determining the total of said rates of fluid flow, subjecting one of said fluids to rate control in accordance with variations in said ratio, and subjecting one of said fluids to rate control in accordance with variations in the total.

JOSEPH C. ALBRIGHT.